US009084041B2

(12) United States Patent
Tsai

(10) Patent No.: US 9,084,041 B2
(45) Date of Patent: Jul. 14, 2015

(54) WATER RESISTANT HOLDER WITH A SPEAKER FOR ELECTRONIC PRODUCT

(75) Inventor: Shih-Hsien Tsai, Keelung (TW)

(73) Assignee: Rideman Technology Ltd., Taipei (TW)

( * ) Notice: Subject to any disclaimer, the term of this patent is extended or adjusted under 35 U.S.C. 154(b) by 318 days.

(21) Appl. No.: 13/585,846

(22) Filed: Aug. 15, 2012

(65) Prior Publication Data

US 2014/0050347 A1 Feb. 20, 2014

(51) Int. Cl.

| | |
|---|---|
| ***H04R 1/02*** | (2006.01) |
| ***H04M 1/00*** | (2006.01) |
| ***G10K 1/00*** | (2006.01) |
| *H04R 1/30* | (2006.01) |

(52) U.S. Cl.

CPC .. *H04R 1/02* (2013.01); *H04R 1/30* (2013.01); *H04R 2499/11* (2013.01)

(58) Field of Classification Search

CPC ................ G06F 1/1626; G06F 1/1656; G06F 2200/1633

USPC ......... 381/340, 337, 338, 332, 386, 117, 150, 381/342, 349, 382, 59, 392, 395, 189; 181/152, 155, 175, 182, 192, 199; 361/752, 679.09, 679.21, 714; 174/50; 206/30

See application file for complete search history.

(56) References Cited

U.S. PATENT DOCUMENTS

| | | | | |
|---|---|---|---|---|
| 2002/0009195 | A1 * | 1/2002 | Schon | 379/454 |
| 2009/0312058 | A9 * | 12/2009 | Wood et al. | 455/566 |
| 2013/0027862 | A1 * | 1/2013 | Rayner | 361/679.3 |
| 2013/0170686 | A1 * | 7/2013 | Lester, Jr. | 381/338 |

* cited by examiner

*Primary Examiner* — Duc Nguyen
*Assistant Examiner* — Yogeshkumar Patel
(74) *Attorney, Agent, or Firm* — Leong C. Lei

(57) ABSTRACT

A water resistant holder with a speaker for electronic products, which is used to contain a portable electronic product, and is designed to be water resistant by way of the provision of the base that can be disposed at an appropriate angle and simultaneously allows the sound to be amplified and played out through the base; said holder includes a base and a cover for mounting on the base, wherein the base is provided on its top with a platform, which has a surrounding groove for receiving the edge of the cover for fastening purpose; the interior of the platform has locking pieces accommodating to the portable electronic product, and has a sound receiving hole at an appropriate position for connecting to the sound outlet; the sound receiving hole is connect to the loudspeaker hole via a through path in the speaker under the base, such that the sound can be amplified.

1 Claim, 7 Drawing Sheets

WATER RESISTANT HOLDER WITH A SPEAKER FOR ELECTRONIC PRODUCT

FIELD OF THE INVENTION

The invention relates to a holder for a portable electronic product, particularly to a water resistant holder with a speaker for electronic products that has the characteristic of water resistant, being disposed at various angles, and sound amplifying.

BACKGROUND OF THE INVENTION

In view of the improvement of technology and the trends, many electronic products with an audio player have been developed constantly, such as cell phones, MP3 players, tablet computers, digital cameras, etc. Those electronic products are used extensively in daily lives; users are carrying the electronic products at the time when staying at home, outdoor or attending activities. As such, peripheral products for those portable electronic products are developed to satisfy the need.

Those peripheral products for electronic devices must be water resistant, so that when they are used in connection electronic devices as holders with a speaker at the time when playing music or films, the peripheral products can be used outdoor without the risk of getting wet by rain, in case of a rainy day. Likewise, the users may use the electronic products along with the water resistant peripheral products for listing to music in the bathroom, to prevent water from permeating into the electronic devices and causing damage.

A lot of users would choose a holder of supportive function to keep the electronic product disposed incline at an angle that enabling best operation on the table for watching films, photos or reading electronic books more conveniently. Furthermore, while portable electronic products usually have a sound outlet for audio playing, as the inbuilt speaker has limited effect, the user need to purchase another speaker for use in connection with the electronic product to secure a better sound effect. However, it incurs a further cost, and brings the user inconvenience at carrying an additional device, not to mention the extra consumption of the power of the electronic product.

In view of the above, the inventor has positively researched to design a holder structure having the function of protection, support, sound amplifying, etc.

SUMMARY OF THE INVENTION

The invention is to provide a water resistant holder with a speaker for electronic products, which may allow use of the electronic product outdoor and in bathroom without getting wet by rain or water. In addition, the holder may provide the portable electronic product with protection and support, as well as the function of sound amplifying.

To obtain the above objects, the invention is consisted of at least a base and a cover for mounting on the base. The base is provided on its top with a platform, which has a surrounding groove for receiving the edge of the cover for fastening purpose, and is provided at an appropriate position a sound receiving hole for connecting to the sound outlet of the electronic product. A speaker is provided under the bottom of the base, by way of which and the edge of the base, the holder can be disposed at a most preferable angle vertically or horizontally. The interior of the speaker has a loudspeaker hole gradually expanding outward to form a horn shape, whereas the narrow end of the loudspeaker hole is connected to the sound receiving hole above the platform by way of a through path. Thereby, the sound from the electronic product can be received from the sound outlet of the base through to the sound receiver, and then played out of the loudspeaker hole with an amplifying effect.

To completely appreciate these and other objects of the present invention as well as the invention itself all of which will become apparent to those skilled in the art, the following detailed description of the invention and the claims should be read in conjunction with the accompanying drawings.

DETAILED DESCRIPTION OF THE PREFERRED EMBODIMENTS

Figure 1:
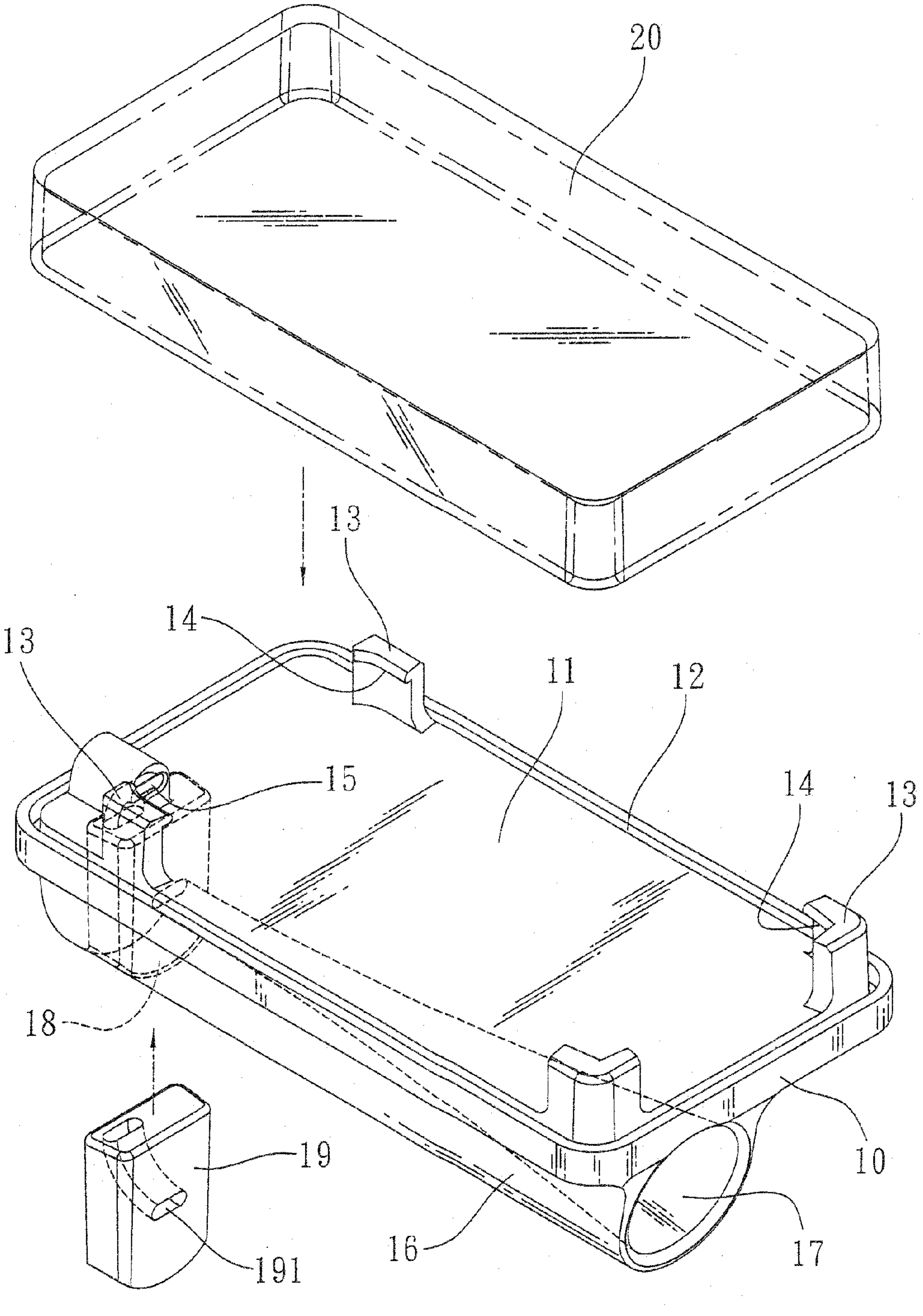
FIG. 1 is an exploded view of the intention.
Figure 2:
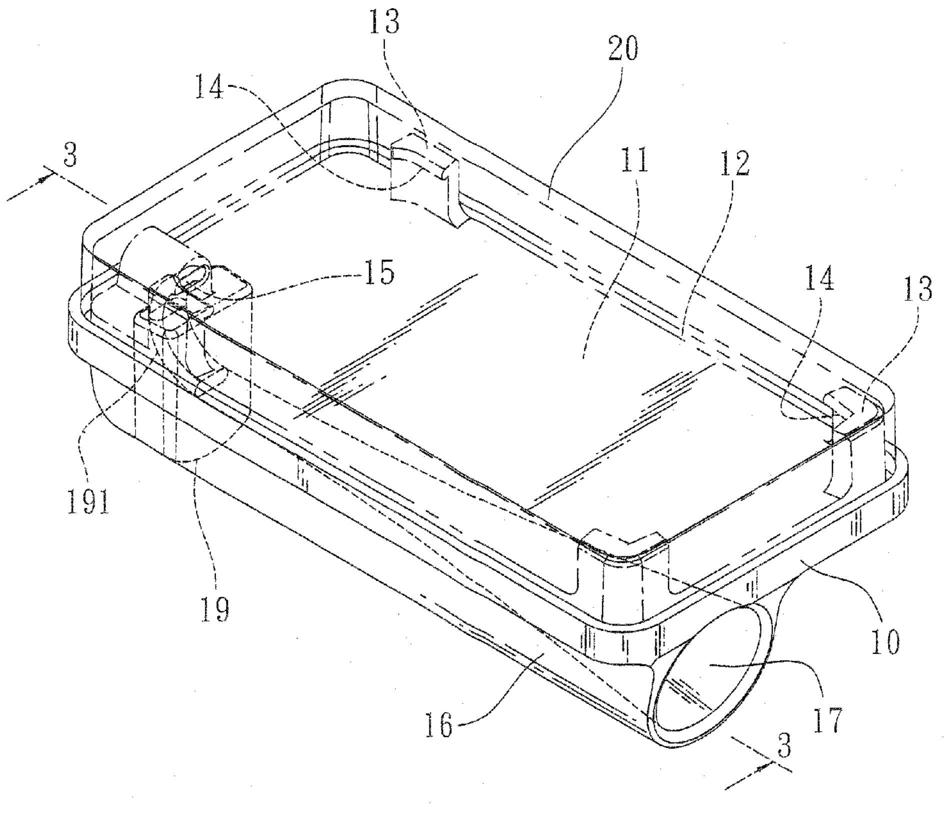
FIG. 2 shows the invention after being assembled.
Figure 3:
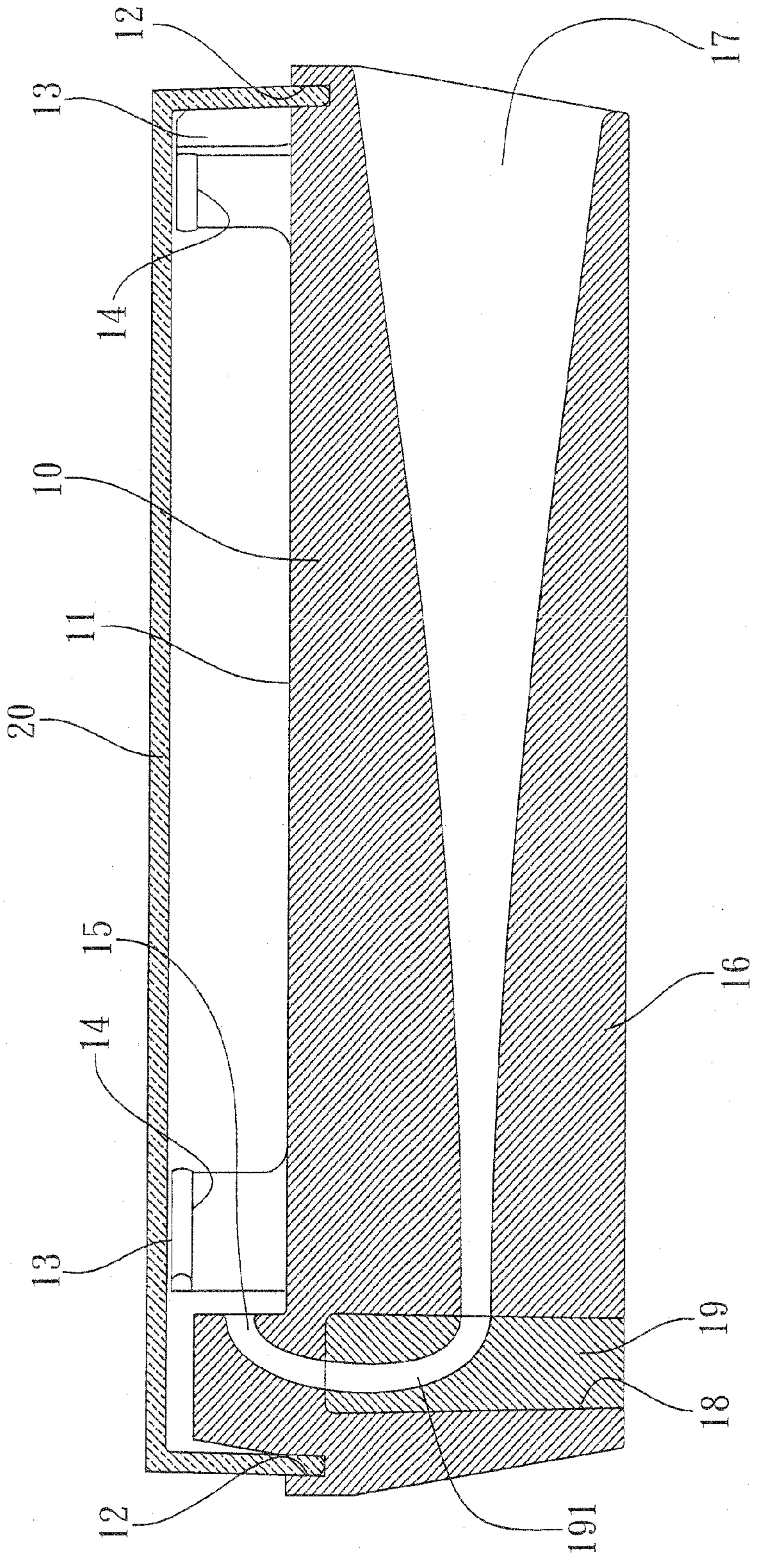
FIG. 3 is a cross-sectional view of the invention.
Figure 4:
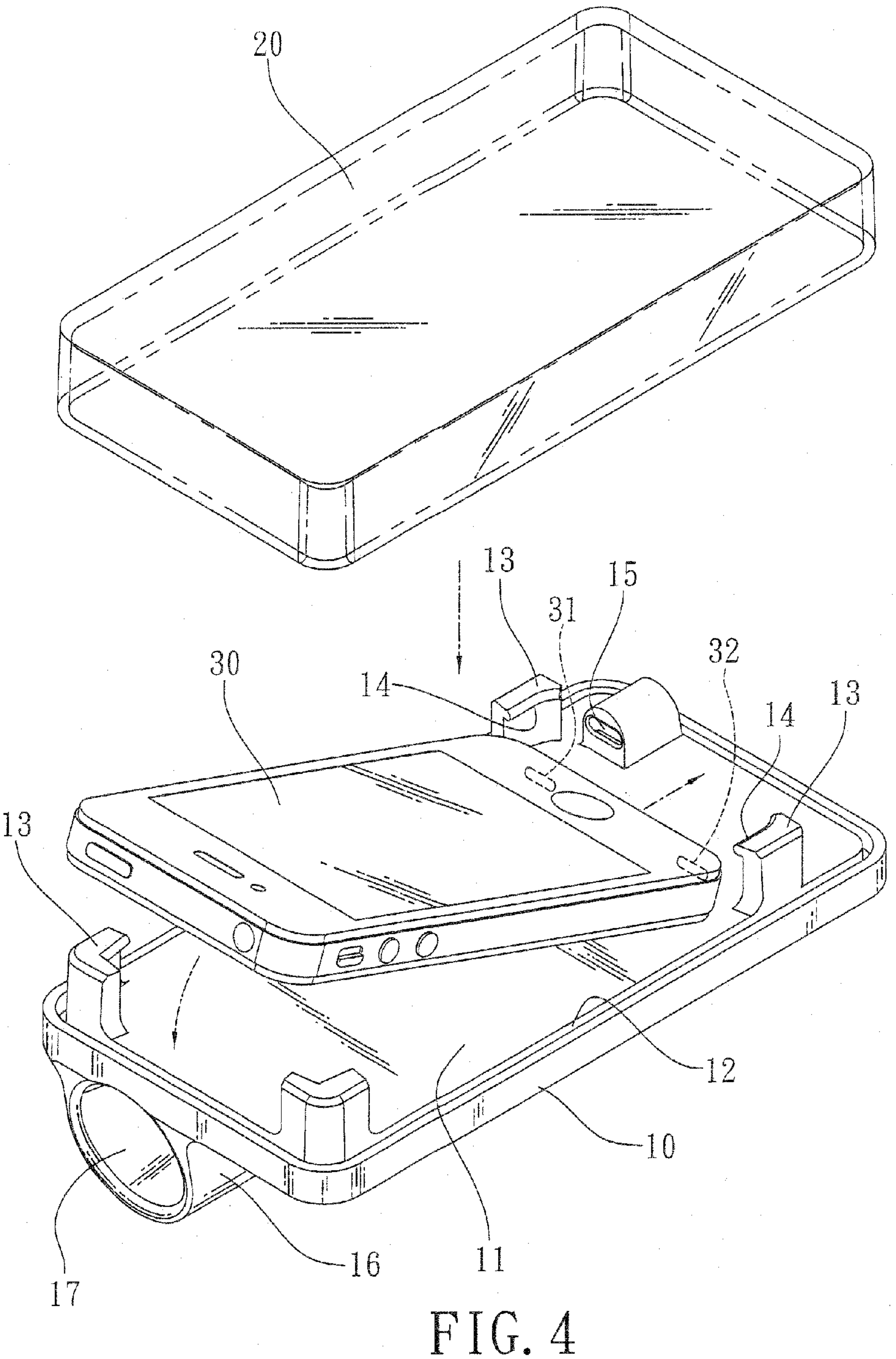
FIG. 4 shows an application of the invention to a portable electronic product.
Figure 5:
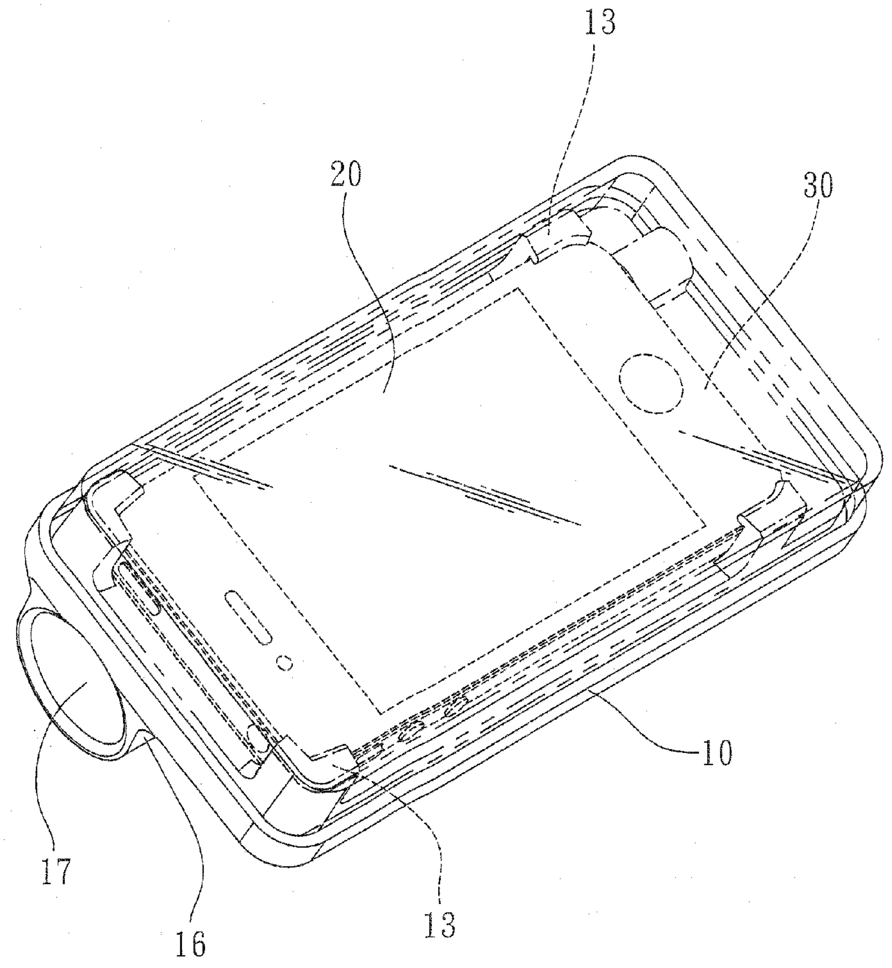
FIG. 5 shows an embodiment of the invention.

Referring to FIGS. 1~4, the present invention is to provide a holder structure with a speaker, including a base 10 and a cover 20 for receiving a portable electronic products 30 (as shown in FIG. 4). The portable electronic product 30 has a sound outlet 31 (as shown in FIG. 4). In the embodiment of the invention, the sound outlet 31 is provided on the bottom of the portable electronic product 30, which may be set at different positions depending on the various modes of the electronic products.

As shown, the base 10 is in form of a rectangle, which may be in form of other outlines to accommodate different electronic products of various outer-appearances and sizes. The appropriate materials can be plastics, rubber, silicone or other resilient and flexible materials. The base 10 is provided on its top a platform 11, which is provided with a surrounding groove 12, and a plurality of interior locking pieces 13, such that the respective locking pieces 13 are in a position corresponding to the outline of the electronic product 30 to receive and hold the electronic product 30. As shown in the embodiment, each of the locking pieces 13 is in form of an L shape extruding from the respective corners of the platform 11, and has an interior locking edge 14 for receiving and holding the electronic product 30. A sound receiving hole 15 is installed inside one of the locking pieces 13 at the position corresponding to the sound outlet 31 of the electronic product 30. A speaker 16 extrudes from the bottom of the base 10. The interior of the speaker 16 has a loudspeaker hole 17 gradually expanding outward to form a horn shape, whereas the narrow end of the loudspeaker hole 17 is connected to the sound receiving hole 15 above the platform 11 by way of a through path 191. In the embodiment, in consideration of the design of model and the cost, the end of the loudspeaker hole 17 of the speaker 16 has a chamber 18 which is interiorly installed with a plug 19 in which the through path 191 is provided for connecting the sound receiving hole 15 and loudspeaker hole 17.

In the embodiment as shown, the portable electronic product 30 has a microphone sound receiver 32 at the opposite side to the sound outlet 31 (see FIG. 4). With the sound receiver 32 of the electronic product 30 exposed out of the holder 10, the user can directly talk over the phone without taking out the electronic product 30, thereby enhancing the convenience in use.

The cover 20 is transparent and is designed for mounting on the platform 11 of the base 10 with its edge corresponding to the surrounding groove 12 of the platform 11 for fastening purpose. The cover 20 has the function of anti-dust, as well as water resistant for use in the bathroom or outdoor, to secure a better protection of the portable electronic product 30.

Figure 6:
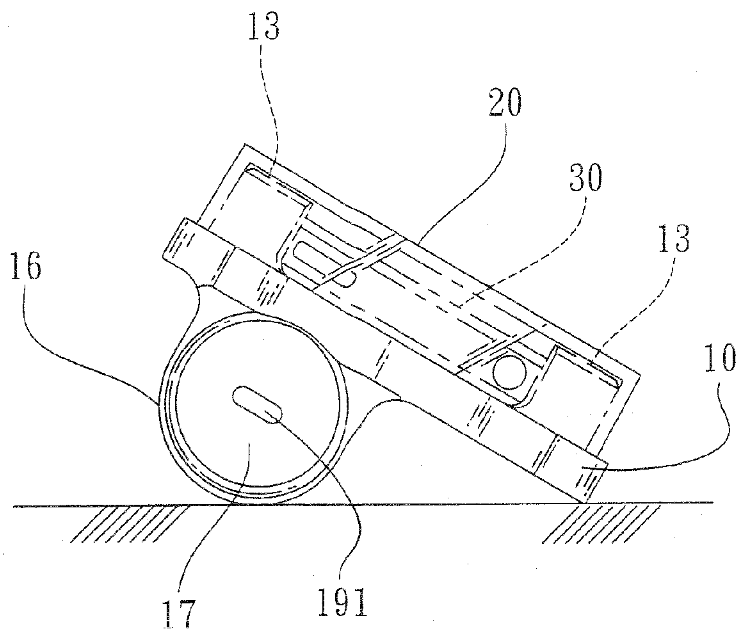
FIG. 6 is a side view of the embodiment in FIG. 5 showing an angle for horizontally disposing the invention.
Figure 7:
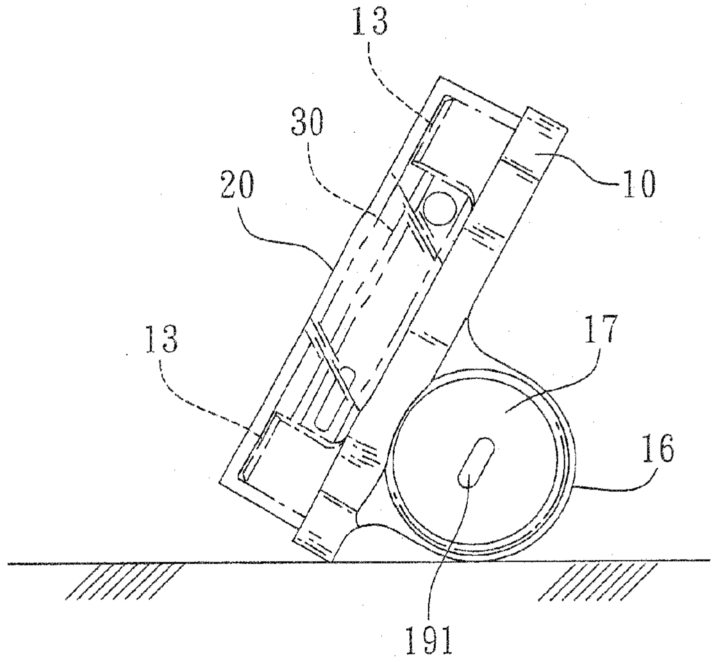
FIG. 7 is a side view showing another angle for horizontally disposing the invention.
Figure 8:
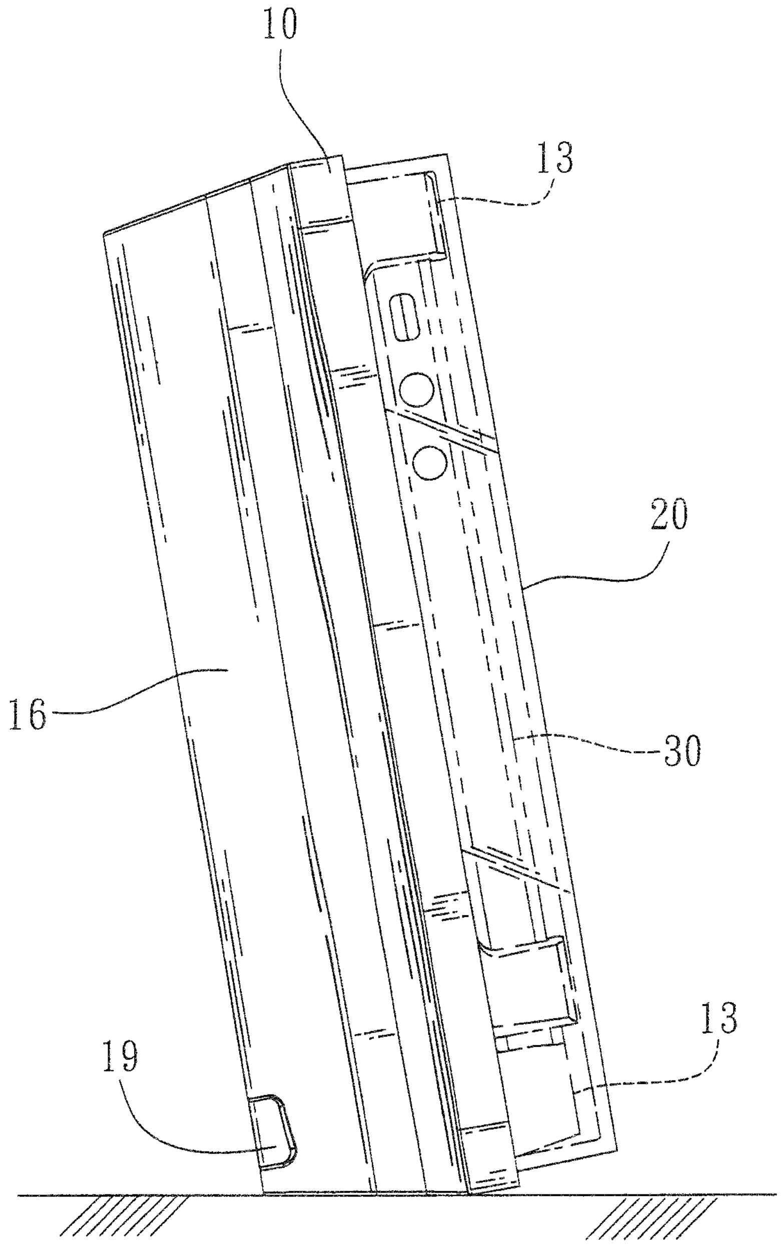
FIG. 8 is a side view of another embodiment of the invention, showing an angle for vertically disposing the invention.

Referring to FIGS. 4~8, when the invention is in use, the portable electronic product 30 is engaged in the platform 11 of the base 10, such that the sound from the electronic product 30 can be received by the sound receiving hole 15 on the base 10, and transmitted to the horn shape loudspeaker hole 17 at the bottom, and broadcasted thereby to secure a sound amplifying effect. Furthermore, the speaker 16 extruding from the bottom of the base 10 is provided horizontally, thereby the holder can be disposed at a smooth incline angle via the support of the edge of the speaker 16 and the far end of the base 10 for working purpose (as shown in FIG. 6). Alternatively, the user may also interact with the electronic product 30 on music playing and keyboard operation, such as typing, playing games, reading electronic books by way of disposing the near end of the base 10 against the edge of the speaker 16 such that the electronic product 30 can be disposed at an rather upstanding angle (as shown in FIG. 7) to ease the user to watch film or electronic album. In addition to the above-mentioned angles for disposing the holder with a speaker, the portable electronic product 30 can be steadily, vertically disposed via the appropriate incline provided at the opposite end to the loudspeaker hole 17 of the speaker 16 under the base 10 for displaying purpose (as shown in FIG. 8).

Concluded above, unlike the prior arts, the holder structure with a speaker according to the invention does not need to additionally adopt any loudspeaker, since the holder with a speaker has an excellent function of sound amplifying. Furthermore, by way of the holder with a speaker, the portable electronic product can be held at the most preferable angle to increase the function and utility thereof.

While certain novel features of this invention have been shown and described and are pointed out in the annexed Claims, it is not intended to be limited to the details above, since it will be understood that various omissions, modifications, substitutions and changes in the forms and details of the device illustrated and in its operation can be made by those skilled in the art without departing in any way from the spirit of the present invention.

Although specific embodiments have been illustrated and described, it will be obvious to those skilled in the art that various modifications may be made without departing from what is intended to be limited solely by the appended claims.

The invention claimed is:

1. A water resistant holder with a speaker for electronic products, which is adapted to contain a portable electronic product having a sound outlet, and is consisted of a base and a cover, characterized by:

the base is provided on its top with a platform, which has a surrounding groove, and respective interior locking pieces in form of an L shape extruding from the respective corners of the platform; each locking piece has an interior locking edge engageable with and thus holding the portable electronic product in position on the platform, and a sound receiving hole is installed inside one of the locking pieces; a speaker is provided under the bottom of the base in the form of a ridge raised from the bottom of the base and substantially parallel to two opposite side edges of the base; the interior of the speaker has a loudspeaker hole gradually expanding outward to form a horn shape, whereas the narrow end of the loudspeaker hole is connected to the sound receiving hole above the platform by way of a through path; the speaker under the base has a chamber having an opening that receives a separate plug in which the through path is provided to insert into the chamber in such a way that the through path communicates with both the loudspeaker hole of the speaker and the sound receiving hole of the base; and the cover is transparent and is designed for mounting on the platform of the base in such a way that a circumferential edge of the cover is corresponding to and insertable, through fitting, into the surrounding groove of the platform for fastening purpose so that the cover and the base collectively house the portable electronic device therein in a water resistant manner;

wherein the raised ridge of the base is spaced from the two opposite side edges of the base by first and second distances so that the portable electronic product is selectively positionable at a first supportive angle or a second supportive angle defined by placing raised ridge and one of the two opposite side edges of the base on an external fixture surface, and the sound from the electronic product is transmittable from sound outlet through the sound receiving hole of the base and the through path of the plug, and then played out of the loudspeaker hole;

wherein the speaker on the bottom of the base is provided with an appropriate incline on a side edge of the base that is opposite to the loudspeaker hole such that the base is positionable at a third supportive angle on an external fixture surface; and wherein the base is made of a material of plastics, rubber or silicone.

* * * * *